Figure 1:
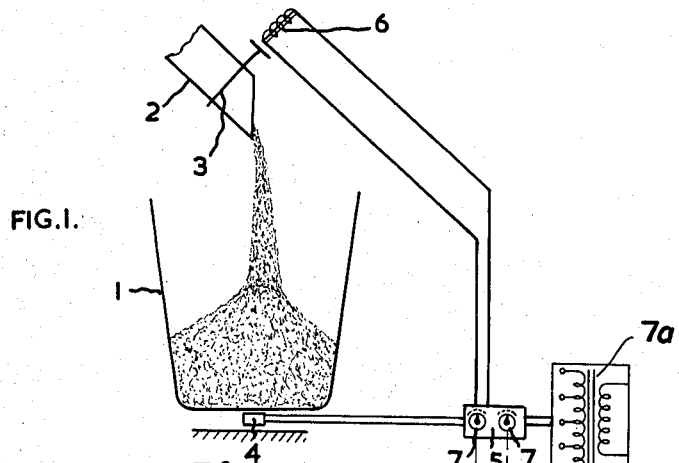

July 12, 1966
D. W. L. CLAMP
3,260,320
BATCH WEIGHING OF FLOWABLE MATERIAL WITH SUPPLY CUT-OFF TIMED
TO ANTICIPATE FALLING MATERIAL IN TRANSIT
Filed March 5, 1964

DAVID W. L. CLAMP

By: Scrivener Parker Scrivener & Clarke

United States Patent Office 3,260,320
Patented July 12, 1966

3,260,320
BATCH WEIGHING OF FLOWABLE MATERIAL WITH SUPPLY CUT-OFF TIMED TO ANTICIPATE FALLING MATERIAL IN TRANSIT
David Warwick Lloyd Clamp, Cwmbran, Monmouthshire, England, assignor to Girling Limited, Tyseley, Birmingham, England, a British company
Filed Mar. 5, 1964, Ser. No. 349,647
3 Claims. (Cl. 177—1)

This invention relates to the weighing out of granular, powdered or liquid materials in batches. Where such a material is to be weighed out by allowing it to pass from a channel, pipe or similar guide into a hopper and for the flow of material to be halted by a valve or gate in the guide when a predetermined weight has been reached, as detected by weighing means acted on by the hopper, there will be an error in the final weight of material in the hopper, caused by the continued flow of the residue which was already between the valve or gate and the hopper at the moment the valve closed. It is possible to allow for this to some extent by subtracting a fixed amount from the total weight to be reached to initiate closing of the valve, but this crude form of correction is far from accurate.

According to the invention it is now proposed, in the batch weighing of granular, powdered or liquid material, in which the flow of the material into a weighing hopper is cut off by a gate or valve when a predetermined weight has been reached, to feed a correcting signal into the weighing mechanism to advance the instant at which the flow of material is cut off in order to allow for the material in transit between the point of cut-off and the hopper, the amount by which the instant of cut-off is advanced being varied in accordance with the density of the material being weighed out. In this way we can allow not merely for the volume of the guide between the gate or valve and the hopper, but for its actual weight. However, even this is not enough for complete accuracy and preferably, according to a further feature of the invention the correcting signal is also modified in accordance with the weight of material in the hopper in such a manner that, since the height of the surface of the material is dependent on the weight of material in the hopper, it allows also for the changing amount of the residue in transit between the valve and the hopper as the level rises. For example, if the batch to be weighed is a small one the residue will be larger than if the batch fills the hopper up to the top.

The invention is applicable primarily to those weighing systems in which the magnitudes are obtained in the form of electrical signals. For example in one possible system a voltage signal proportional to the weight of material in the hopper (derived for example from load cells supporting the hopper) is compared with a reference signal derived, for example, from the secondary winding of a transformer. When the signals are equal the gate or valve is closed. An electrical signal representing the tare weight of the hopper is subtracted from the weight signal.

The invention is applied to such a system by adding to the weight signal an electrical correcting signal which is made dependent on the density of the material being weighed and is also modified in accordance with the weight of material in the hopper.

Figure 2:
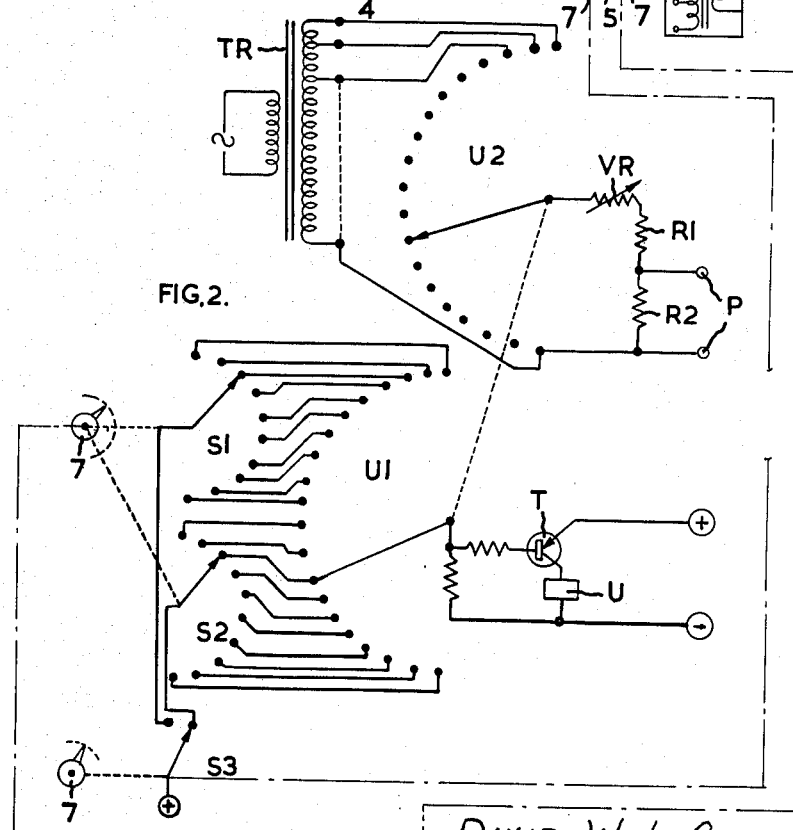

The invention will now be further described by way of example with reference to the accompanying drawings, in which:

FIGURE 1 is a diagrammatic illustration showing the purpose of the invention and how it is applied; and FIGURE 2 is a circuit diagram of a compensating arrangement.

FIGURE 1 shows a weighing hopper 1, into which granular or powdered material (or it could be a liquid) is flowing from a delivery chute 2, of which the outlet is controlled by a cut-off valve indicated diagrammatically at 3. The hopper is being weighed by means indicated as a lead cell 4 producing an electrical signal dependent on the weight of the hopper and its contents. It is desired to fill the hopper 1 with a predetermined weight of the material. This is achieved by providing electrical measuring means, indicated by the box 5, arranged to energise a solenoid 6 to operate the cut-off valve 3 when the desired weight, set manually by means of selector dials 7, is reached. The dials 7 can for example operate moving contacts which pass over a series of fixed contacts connected to successively higher voltages derived from multiple tappings on the secondary winding of a transformer 7a fed from a constant voltage source, and a balance-detecting device is arranged to energise the solenoid 6 when the voltage output of the load cell 4 (minus a voltage representing the weight of the hopper 1) equals the voltage set by the dials 7. However there is a certain amount of material in mid-air between the valve 3 and the surface of the material in the hopper at the instant the valve closes and this is added to the material in the hopper after the valve has closed.

Where we are only handling one single material and where the weight to be weighed out each time is the same this error can be allowed for by adding a fixed value into the weight signal. However in the batch weighing of various ingredients in turn both the density of the material and the amount in each successive weighing are liable to vary widely. This second factor varies the height of the upper surface of the material in the hopper 1 at the instant the valve closes and hence it varies the length of the column of material left in mid-air at this instant.

We allow for both these factors by means of the circuit shown in FIGURE 2. Connected to the shafts of the two selector dials 7 are the moving contact arms of additional switches S1, S2 and S3. In the example under consideration one of the dials 7 is a ten-position dial and selects the desired weight in 100 lb. units, whilst the other dial selects the weight in 1000 lb. units, so that any weight between zero and 1,900 lb. can be set in steps of 100 lb. There may also be a third dial (not shown) setting the weight in one pound units, but this is not used in the circuit of FIGURE 2 as the desired correction is sufficiently accurate if the weight is allowed for to the nearest 100 lb.

The switches S1 and S2 are connected to the 100 lb. unit dial 7 whilst the switch S3 is connected to the other dial. It will be seen that the switch S3 allows the connection of a positive source of electric current to the moving contact of either switch S1 or S2 according to whether the switch S3 has been moved to the zero or 1000 lb. position.

The ten fixed contacts of each of the switches S1 and S2 are connected to corresponding contacts of a twenty-contact uniselector U1. Its moving arm is connected to the base of a transistor T connected across a source of direct current with the coil U of the uniselector in the path of its emitter-collector current.

The arm of the uniselector U1 is mechanically linked to the arm of a twenty-way switch U2, the fixed contacts of which are connected to successive tappings on the secondary winding of a transformer TR, so that the voltage on the moving contact varies progressively with its angular position. This moving contact is connected through a variable resistor VR to a potentiometer chain formed by fixed resistors R1 and R2, and the voltage appearing across the resistor R2 is applied through terminals P to the remainder of the weighing circuit (not shown). It is added to the weight signal from the load cell 4.

It will be understood that when the operator sets a predetermined weight on the selector dials 7 to set the appropriate voltage in the balancing circuit, against which the voltage from the cell 4 is balanced, he also causes the switches S1, S2 and S3 to move to corresponding positions. (In the example shown the switches are in the positions corresponding to a weight of 1,200 lb.) The uniselector U1 immediately starts hunting round until its moving arm reaches that one of its twenty contacts that is connected to the positive supply through the switches S1, S2 and S3. When it reaches this contact it stops because this positive voltage, applied now to the base of the transistor, cuts off the transistor and de-energises the operating coil U. The arm of the switch U2 now carries a voltage that is dependent on the setting of the dials 7. The variable resistor VR is adjusted by the operator by means of a dial calibrated in terms of density, so that it modifies this voltage further, the density being set according to the material being weighed. The resulting final correcting voltage appearing across the resistor R2 is added in the balancing circuit (not shown) to the output of the cell 4, so that the balance is reached sooner than would be the case if no correcting voltage were applied, and so the valve 3 is closed sooner. The amount of time by which the closing of the valve 3 is advanced is greatest when the amount to be weighed out is small and the density of the material is high, and is least when the material is of low density and when the amount to be weighed out nearly fills the hopper 1. Accordingly, the correcting voltage across resistor R2 is large when the weight set on the dials 7 is small and is small when the weight set on the dials 7 is large. Furthermore the resistance of the resistor VR is set to a low value when material being weighed is heavy and to a high value when it is light.

The invention has been described with reference to a digital electrical weighing system but it will be understood that it could equally well be applied to an analogue system or even to a system not employing electrical magnitudes at all. For example, where the weighing is done purely mechanically, the compensation described above could be achieved by suitable mechanical linkages. Where the weighing is electrical but analogue instead of digital the multi-contact switches such as the switch U2 could be replaced by continuously variable potentiometers.

Furthermore the invention is not limited to an arrangement in which the desired weight is set manually. For example information both on the desired weight and on the density of the material could be contained in punched cards or tape and caused to set the weighing mechanism automatically.

I claim:
1. A method of batch weighing flowable material comprising allowing the material to fall in a stream into a weighing hopper, cutting off the flow of material to the hopper ahead of the instant at which the weight of material in the hopper attains the desired value so as to allow for the weight of the stream of material in transit at the instant of cut-off, inversely varying the degree of advance of the instant of cut-off in accordance with the weight of material weighed and consequently directly with the length of the stream and further varying the instant of cut-off inversely with the density of the material being weighed.

2. Apparatus for the batch weighting of flowable material comprising a chute, having an outlet, a cut-off valve in said chute adjacent said outlet, a hopper disposed below said outlet and spaced therefrom, weighing means producing a first electrical signal dependent in magnitude on the weight of material in said hopper, adjustable desired-weight-signal producing means producing a second electrical signal of variable magnitude, means for adjusting the magnitude of said second signal, means generating a third signal which is depenedent inversely on the setting of said adjusting means, means for generating a fourth signal which is of variable magnitude in accordance with the density of the material being weighed, means for comparing said second signal with the sum of said first and third and fourth signals, and an operative connection between said signal-comparing means and said cut-off valve, acting to close said valve on equality of said signals.

3. Apparatus as set forth in claim 2 wherein said third signal generating means comprise a multiple voltage source, a first multi-contact switch connected to said source, a uniselector mechanically connected to said switch, a second multi-contact switch feeding said uniselector and adapted to connect a voltage to a selected contact of said uniselector, and means coupling said second switch to said second signal adjusting means.

References Cited by the Examiner
UNITED STATES PATENTS

| | | | |
|---|---|---|---|
| 864,460 | 8/1907 | Ertner et al. | 177—122 |
| 2,705,607 | 4/1955 | Inglett | 17—1 |
| 2,868,491 | 1/1959 | Thorsson et al | 177—70 |
| 2,922,611 | 1/1960 | Aust | 77—1 |
| 2,938,701 | 5/1960 | Thorsson et al. | 177—70 |
| 3,076,515 | 2/1963 | Chilton | 177—210 X |
| 3,106,974 | 10/1963 | Williams | 77—70 |

LOUIS J. CAPOZI, *Primary Examiner.*

LEO SMILOW, G. J. PORTER, *Assistant Examiners.*